United States Patent
Zanaty

(10) Patent No.: US 7,209,766 B2
(45) Date of Patent: Apr. 24, 2007

(54) WIRELESS COMMUNICATION SYSTEM INCLUDING A UNIVERSAL C-CHIP AND METHOD THEREOF

(75) Inventor: Farouk M. Zanaty, Loveland, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 547 days.

(21) Appl. No.: 10/175,814

(22) Filed: Jun. 21, 2002

(65) Prior Publication Data

US 2004/0198333 A1    Oct. 7, 2004

(51) Int. Cl.
    *H04M 1/00*    (2006.01)
(52) U.S. Cl. .................. 455/552.1; 455/553.1; 455/419
(58) Field of Classification Search ........ 455/418, 455/419, 420, 552.1, 550.1, 558, 557, 432.1, 455/448, 352
    See application file for complete search history.

(56) References Cited

U.S. PATENT DOCUMENTS

| | | | | |
|---|---|---|---|---|
| 5,781,723 A | * | 7/1998 | Yee et al. ............... | 713/200 |
| 5,884,168 A | * | 3/1999 | Kolev et al. ............. | 455/432.1 |
| 5,946,634 A | * | 8/1999 | Korpela ................... | 455/552.1 |
| 6,188,898 B1 | * | 2/2001 | Phillips .................... | 455/433 |
| 6,453,167 B1 | * | 9/2002 | Michaels et al. .......... | 455/466 |
| 6,594,505 B1 | * | 7/2003 | Ishii ........................ | 455/552.1 |
| 6,690,949 B1 | * | 2/2004 | Shamlou et al. ........... | 455/557 |
| 6,741,848 B2 | * | 5/2004 | Timonen et al. .......... | 455/405 |
| 6,748,244 B2 | * | 6/2004 | Odinak .................... | 455/569.2 |
| 6,782,260 B2 | * | 8/2004 | Nakakita et al. ......... | 455/435.1 |
| 2002/0039904 A1 | * | 4/2002 | Anderson ................. | 455/456 |
| 2002/0176581 A1 | * | 11/2002 | Bilgic et al. ............... | 380/270 |
| 2003/0023761 A1 | * | 1/2003 | Jeansonne et al. ........ | 709/250 |
| 2003/0054809 A1 | * | 3/2003 | Bridges et al. ............ | 455/419 |
| 2003/0143990 A1 | * | 7/2003 | Minear et al. ............ | 455/418 |
| 2003/0158954 A1 | * | 8/2003 | Williams .................. | 709/230 |

* cited by examiner

*Primary Examiner*—Lester G. Kincaid
*Assistant Examiner*—Fred Casca

(57) ABSTRACT

A wireless communication system and method therefore include a processor programmed with a protocol of a telecommunications provider downloaded from a network, so as to operate the wireless communication system in accordance with the protocol corresponding to a geographical region. The processor includes input and output pins arranged to provide a standard connectivity to electrical components in the wireless communication system. A slot in the wireless communication system receives the processor.

18 Claims, 5 Drawing Sheets

WIRELESS COMMUNICATION SYSTEM INCLUDING A UNIVERSAL C-CHIP AND METHOD THEREOF

BACKGROUND OF THE INVENTION

Wireless phone systems have been implemented using a Time-Division Multiple Access (TDMA) or Code Division Multiple Access (CDMA) architecture. The Electronics Industries Association (EIA) and the Telecommunications Industries Association (TIA) have set standards for an American Digital Cellular (ADC) architecture, which is a dual mode analog and digital system following EIA/TIA document IS-54B. However, different standards have been promulgated for digital cellular phone systems in Europe.

Typically, a wireless cellular telephone user subscribes to one service provider and is assigned a corresponding telephone number. Thus, when the user uses the cellular phone in one geographical location, the user is unable to use the cellular phone in another geographical location without incurring excessive costs. Further, certain cellular phones are adapted to receive a credit-card sized Subscriber Identity Module (SIM). However, the SIM card is able to operate through a specific local provider only, and is not capable of being programmed to store a protocol from a different provider. Further, the SIM cards are not re-programmable.

The user who uses the cellular phone through a telecommunications carrier ("provider") providing telecommunications transmission services in the United States, for instance, may travel to a country in Europe where the provider in the United States does not provide service to the cellular phone in Europe. A reason why the cellular phone set up in the United States cannot work in Europe is because the CDMA architecture or the TDMA architecture used in the United States and the GSM system used in Europe use different standards of cellular architecture and are different base systems. Accordingly, the user is required to either purchase a handset that is configured to use the TDMA architecture or the SIM card. There is a need for a system that allows a user to operate a cellular phone in accordance with a protocol of a telecommunications provider corresponding to a geographical region.

SUMMARY OF THE INVENTION

Various objects and advantages of the invention will be set forth in part in the description that follows and, in part, will be obvious from the description, or may be learned by practice of the invention.

To achieve the above and other objects, the present invention may be accomplished by providing a wireless communication system, including: a processor programmed with a protocol downloaded from a network, of a telecommunications provider corresponding to a geographical region where the wireless communication system is to be used, so as to operate the wireless communication system in accordance with the protocol corresponding to the geographical region.

To achieve the above and other objects, the present invention may be accomplished by providing a wireless communication system, including: processors, each programmed with a protocol of a telecommunications provider, so as to operate the wireless communication system in accordance with the protocol corresponding to a geographical region, wherein the processors include input and output pins arranged to provide a standard connectivity to electrical components in the wireless communication system; and slots receiving the processors.

Furthermore, to achieve the above and other objects, the present invention may be accomplished by providing a wireless communication system capable of receiving a processor, including: electrical components including input and output pins arranged to provide a standard connectivity to the processor; and a slot adapted to allow insertion and removal of the processor and providing connectivity between the electrical components and the processor, wherein the wireless communication system allows the processor to be programmed with a protocol of a telecommunications provider.

Furthermore, a method of a wireless communication system is provided, including: programming a processor with a protocol downloaded from a network, of a telecommunications provider corresponding to a geographical region where the wireless communication system is to be used, so as to operate the wireless communication system in accordance with the protocol corresponding to the geographical region, wherein the processor includes input and output pins arranged to provide a standard connectivity to electrical components in the wireless communication system.

A method of installing and programming a processor for a wireless communication system includes installing the processor in the wireless communication system; connecting the wireless communication system to a computer to access a network; accessing a host provider corresponding to a telecommunications provider of a geographical region where a user needs to use the wireless communication system; transmitting an authentication code from the processor to the host provider; initializing and authenticating the processor by the host provider; downloading to the processor from the host provider a phone number and a phone network identification number; downloading to the processor a protocol of the telecommunications provider; and storing and executing the protocol to operate the wireless communication system in accordance with the protocol corresponding to the geographical region.

These together with other objects and advantages, which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

The above objective and advantages of the present invention will become more apparent by describing in detail preferred embodiments thereof with reference to the attached drawings in which.

DETAILED DESCRIPTION OF THE PREFERRED EMBODIMENTS

Hereinafter, embodiments of the present invention will be described in detail with reference to the attached drawings. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

A cellular phone is provided including a removable and programmable chip. A standard number of pins on the chip connect the chip to electrical components of the cellular phone. The pins on the chip are arranged in a particular layout, where the electrical components in the cellular phone are arranged to correspond to the particular layout.

The chip is adapted to be programmed and re-programmed with a protocol (e.g., TDMA, CDMA, and GSM) of a telecommunications provider, which is downloaded from a network, such as the Internet, so as to operate the cellular phone in a country or countries (i.e., geographical location) using that protocol. The cellular phone unit incorporating the chip would operate in a same manner regardless of the protocol programmed into the chip.

Figure 1:
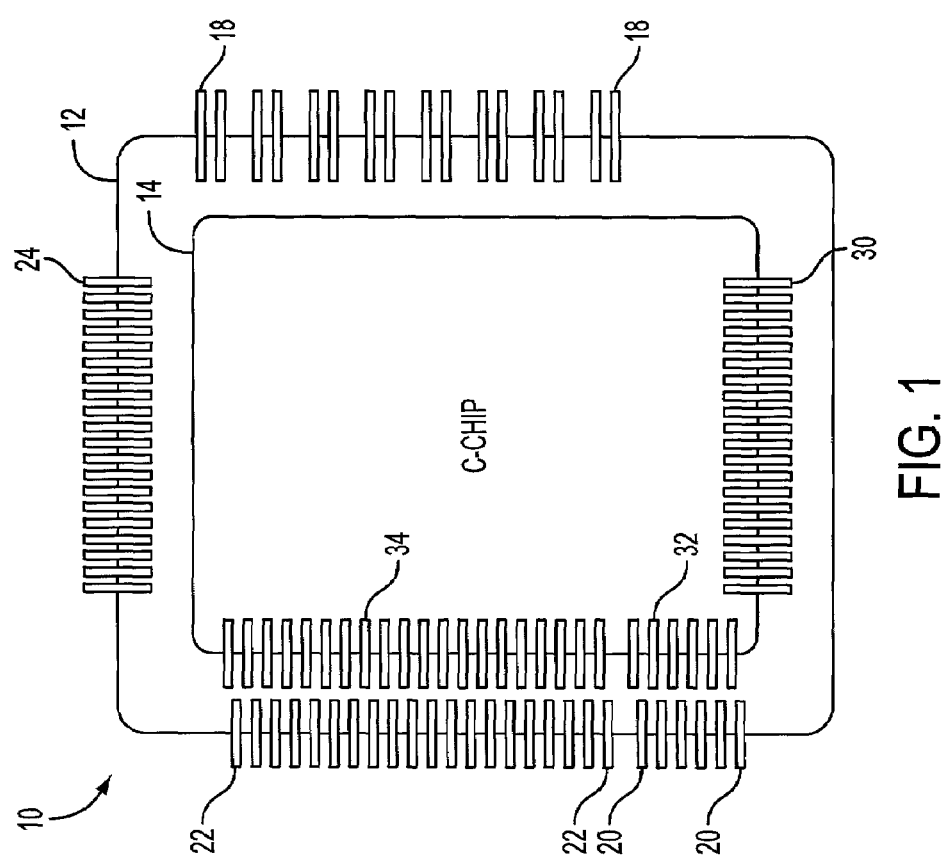
FIG. 1 illustrates a Universal C-Chip in accordance with an embodiment of the present invention.

FIG. 1 illustrates the Universal C-Chip ("C-Chip") 10 in accordance with an embodiment of the present invention. The C-Chip 10 may be a permanent or removable storage, such as MSC8101 manufactured by Motorola of Denver, Colo., or an EEPROM, RAM, or ROM on which the protocol can be stored and executed. The C-Chip 10 includes a plurality of pins arranged in a predetermined manner on at least two layers of the C-Chip 10, a base layer 12 and a projected layer 14. The base layer 12 includes core element pins 18, a first set of optional signaling pins 20, a first set of mandatory signaling pins 22, and a first set of special communication pins 24. The projected layer includes a second set of special communication pins 30, a second set of optional signaling pins 32, and a second set of mandatory signaling pins 34. By distributing the mandatory signaling pins 22, 34, the optional signaling pins 20, 32, and the special communication pins 24, 30 into two sets, a size of the C-Chip 10 may be minimized.

The core element pins 18 have sixteen pins including two pins for a power supply and two corresponding backup pins, two pins for a microphone and two corresponding backup pins, two pins for a speaker and two corresponding backup pins, and two pins for an antenna and two corresponding backup pins. The first and second sets of mandatory signaling pins 22, 34 include a total of forty pins to receive and amplify communication signals from electrical components (not shown) in the cellular phone. The special communication pins 24, 30 include a total of forty pins that may be used to receive and output audio and video signals. In the alternative, the first and second sets of the optional signaling pins 20 include a total of twelve pins that may be employed to exclusively or in combination with the special communication pins 24, 30, receive the audio and video signals and/or other types of communication signals to be used by the user of the cellular phone.

Figure 2:
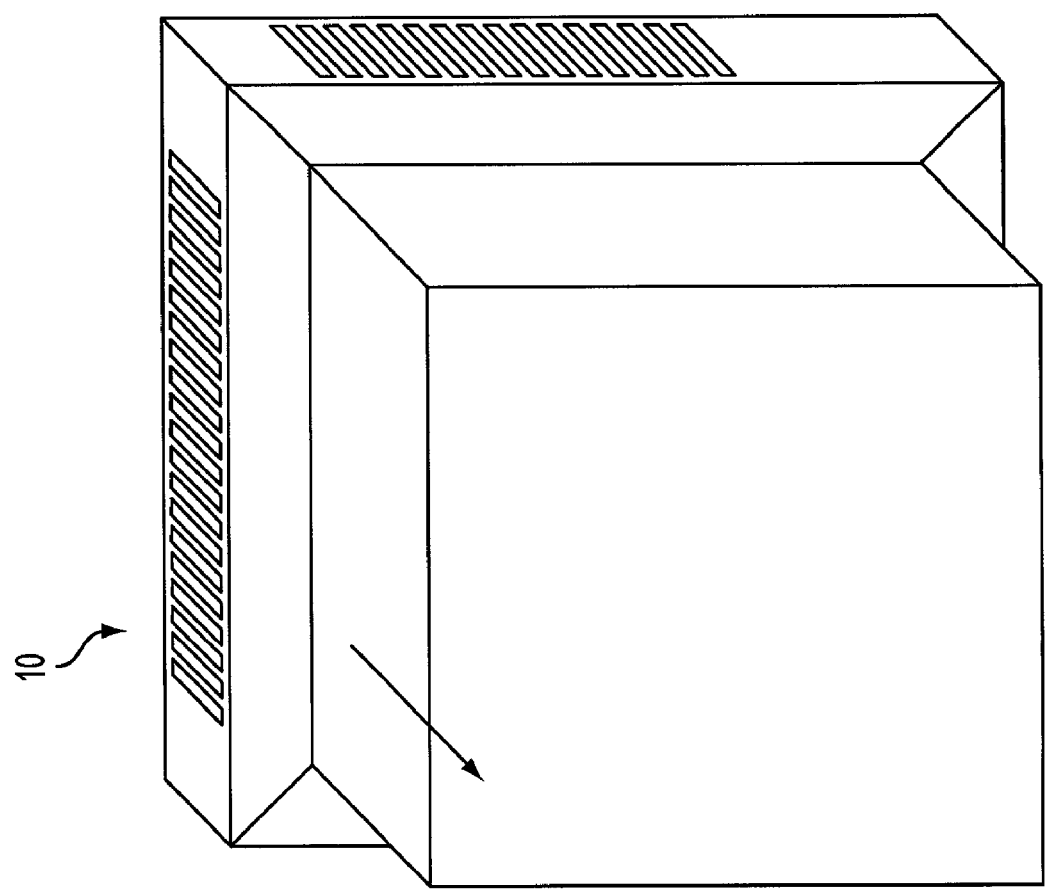
FIG. 2 illustrates a back view of the C-Chip plugged-in a cellular phone.

Although FIG. 1 illustrates the first and second sets of mandatory signaling pins 22, 34 equally divided between the base layer 12 and the projected layer 14, the mandatory signaling pins may be distributed in an alternative manner to minimize the size of the C-Chip 10. Further, although FIG. 1 illustrates a distribution of the special communication pins 24, 30, the core element pins 18, and the optional signaling pins 20, 32 in a predetermined manner, a manufacturer of the C-Chip is not necessarily limited to the distribution shown in FIG. 1, which may be varied. Thus, the manufacturer of the cellular phone including the C-Chip 10 would design the layout of the electrical components in the cellular phone considering the arrangement of the pins on the C-Chip 10. FIG. 2 illustrates a back view perspective of the C-Chip 10 to be plugged in the cellular phone. As shown in FIGS. 1 and 2, although a shape and dimension of the C-Chip may vary and the distribution of the pins may vary, a standard number of pins would be provided.

Figure 3B:
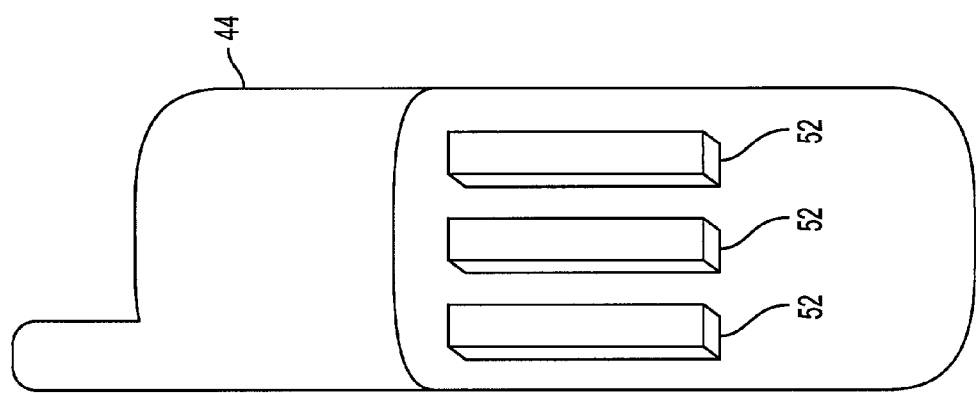
FIG. 3B illustrates a back view of the cellular phone incorporating multiple C-Chips.
Figure 3A:
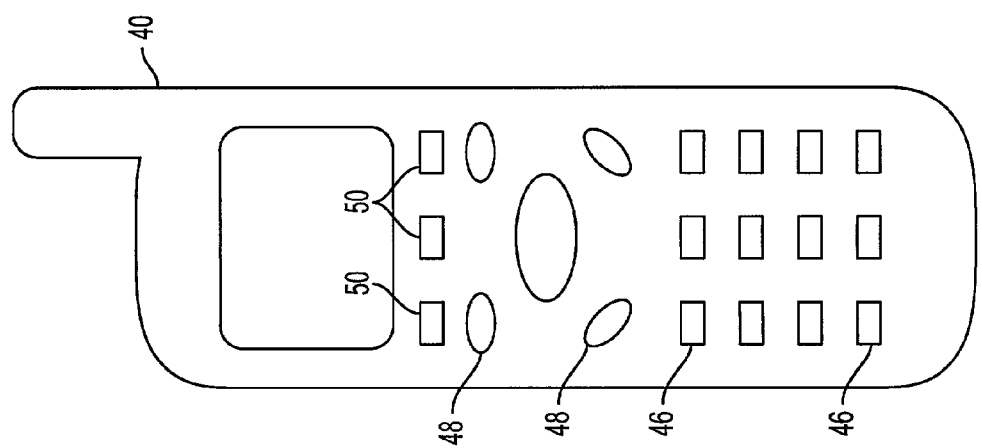
FIG. 3A illustrates a front view of the cellular phone incorporating multiple C-Chips.

FIG. 3A illustrates a front view 40 and FIG. 3B illustrates a back view 44 of the cellular phone incorporating the C-Chip 10. The front view of the cellular phone, aside from the standard numerical pad 46 and function keys 48, further includes toggle switches 50 to toggle between the C-Chips 10 plugged into the cellular phone in order to select the C-Chip 10 in accordance with the protocol corresponding to the geographical location where the user needs to use the cellular phone. The toggle switches 50 allow the C-Chip 10 to be activated/deactivated to and from the cellular phone to start/resume or terminate/stop communication. A number of toggle switches 50 may vary depending on a number of C-Chips 10 provided in the cellular phone. In the alternative, as illustrated in FIGS. 4A and 4B, one toggle switch 54 may be provided to switch between C-Chips 10.

As shown in FIG. 3B, the back view 44 of the cellular phone illustrates three slots 52 on a back plane of the cellular phone for inserting the C-Chips 10. The cellular phone may include more slots to accommodate more C-Chips 10, each C-Chip 10 corresponding to a different protocol. In the alternative, the slots 52 may be provided in a battery of the cellular phone. The user would slide in the C-Chip 10, which would snap into the battery and the battery would be adapted to allow signal transmission between the C-Chip 10 and the cellular phone. The design of the battery of the cellular phone would provide enough room on a top end or a bottom end of the C-Chip 10 to remove and insert the C-Chip 10 in a secured manner. The C-Chip 10 may be designed to allow easy insert and removal from the cellular phone.

Figure 4B:
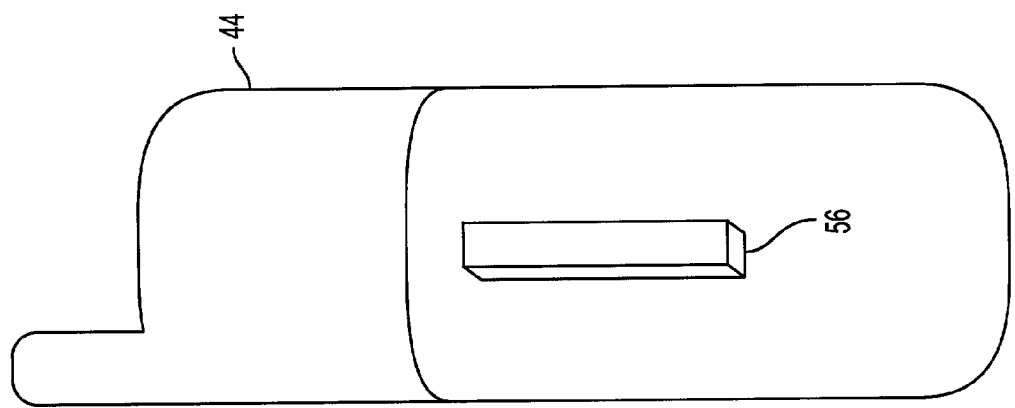
FIG. 4B illustrates a back view of the cellular phone incorporating one C-Chip.
Figure 4A:
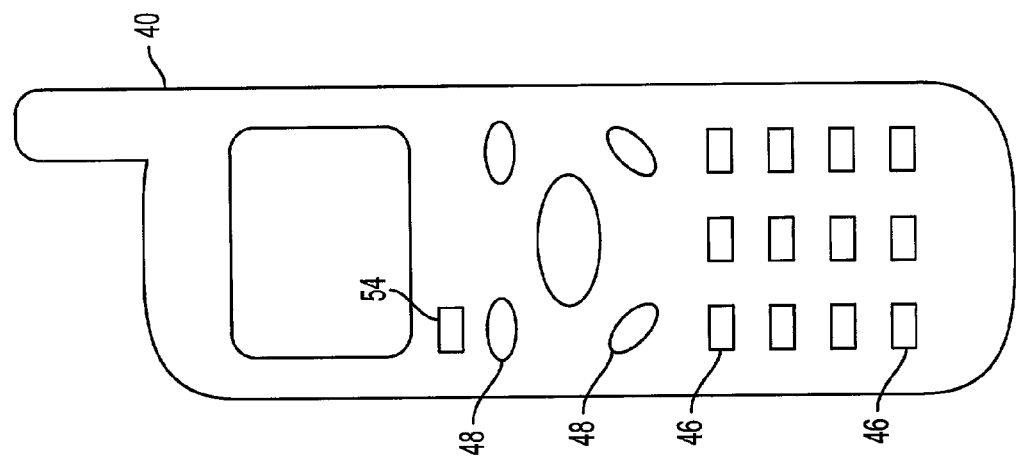
FIG. 4A illustrates a front view of the cellular phone incorporating one C-Chip.

Furthermore, in an alternative embodiment, as shown in FIGS. 4A and 4B, the cellular phone may include only one slot 56 to accommodate one re-programmable C-Chip 10 to further reduce the size of the cellular phone. The C-Chip 10 would allow the user to re-program the C-Chip 10 with the protocol associated with the particular protocol of the geographical location where the user needs to use the cellular phone. In another embodiment, the re-programmable C-Chip 10 may be installed within the cellular phone, directly connected to the electrical components of the cellular phone.

Figure 5:
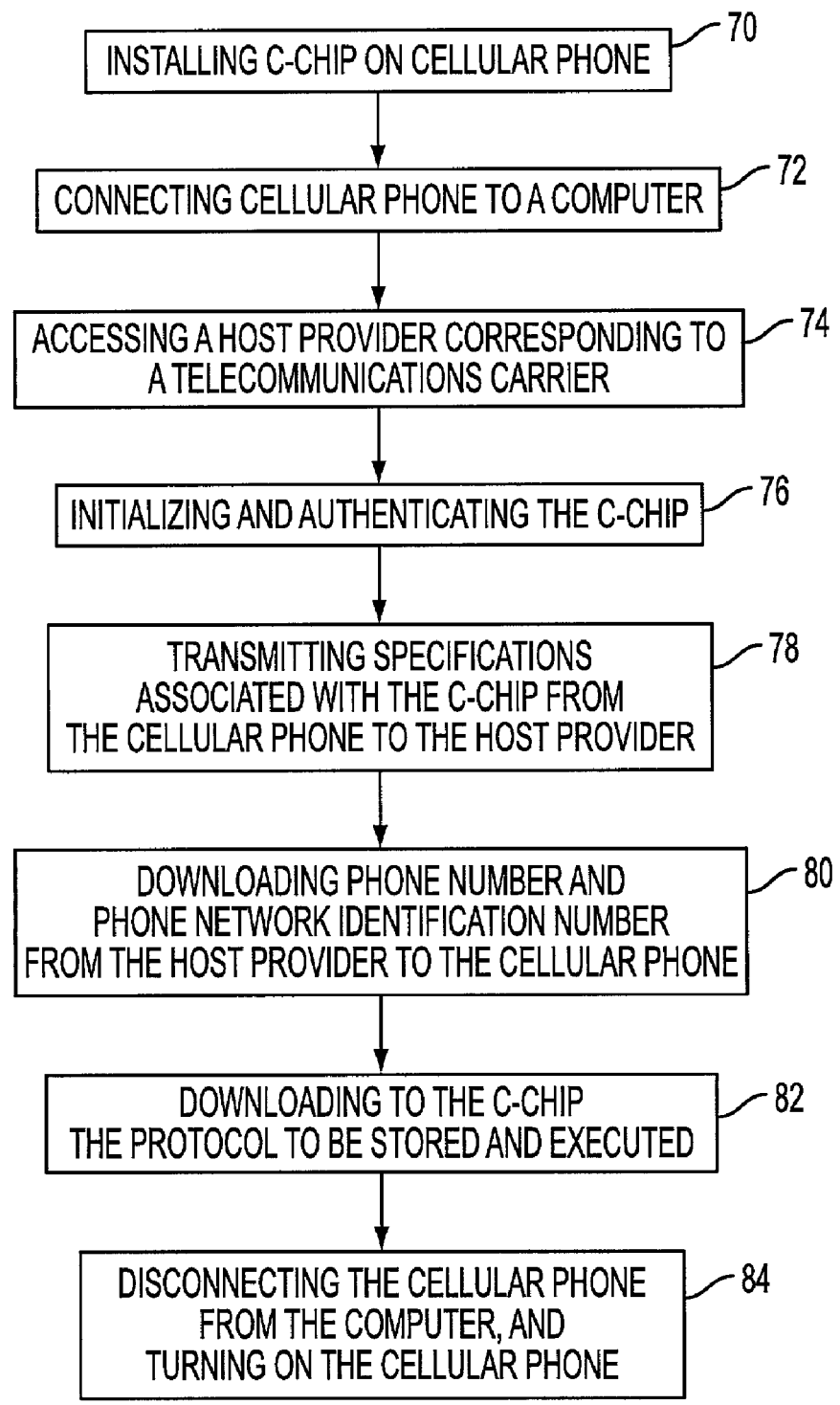
FIG. 5 is a flowchart illustrating a method of installing and programming the C-Chip.

FIG. 5 is a flowchart illustrating a method of installing and programming the C-Chip 10. At operation 70, the user installs the C-Chip 10 in the cellular phone. At operation 72, the user connects the cellular phone to a computer to access the Internet. At operation 74, the user has access to a host provider corresponding to the telecommunications carrier of the geographical location where the user needs to use the cellular phone. At operation 76, the host provider initializes and authenticates the C-Chip 10 in the cellular phone by receiving an authentication code from the C-Chip 10. Once the C-Chip 10 has been authenticated, at operation 78, the cellular phone transmits to the host provider specifications associated with the C-Chip 10 including, for instance, manufacturer information and a serial number.

At operation 80, a phone number and a phone network identification number, for example, are subsequently downloaded from the host provider to the C-Chip 10 corresponding to the cellular phone. Accordingly, the C-Chip 10 is a self-identifying device that upon providing the proper authentication code, produces the manufacturer information, the serial number, the phone number including code details and other operational information. The phone number may be different for each C-Chip 10 or may be the same for all C-Chips 10 installed in the cellular phone. At operation 82, the host provider downloads to the C-Chip 10 the protocol to be stored and executed. At operation 84, the user disconnects the cellular phone from the computer, and turns on the cellular phone. The user may re-program the C-Chip 10 each time by downloading another protocol to operate the cellular phone in a corresponding geographical location.

Further, for illustrative purposes, a following example illustrates a scenario of the user using the cellular phone including three C-Chips 10. The user is traveling to Canada, England, and Egypt and purchases first, second, and third C-Chips 10 in the United States, for instance. The user has the flexibility to either program the C-Chips 10 by using a personal laptop computer, for example, in the United States or in the countries to be visited. Further, the user may also purchase the C-Chips 10 already pre-programmed by the C-Chip manufacturer.

In this instance, the first C-Chip 10 is programmed to provide service coverage across Canada and the United States. The second C-Chip 10 is programmed to operate using British Telecom system, which provides services to Scotland, England, and parts of Western Europe. The third C-Chip 10 is programmed to provide service coverage across Egypt.

If the user travels to Toronto, the user presses the toggle switch 50 and selects the first C-Chip 10 in the cellular phone. The user is now able to make and receive telephone calls to and from Canada, the United States, and other countries. Subsequently, the user travels to England. The user selects the second C-Chip 10 using the toggle switch 50. The user is now able to make and receive telephone calls to and from England, Scotland, and parts of Western Europe. Next, the user travels to Egypt. The user selects the third C-Chip 10 using the toggle switch 50. The user is now able to make telephone calls in Egypt. Thus, the C-Chip 10 allows the user traveling to another country to have access to the local telecommunications provider of that country in order to make and receive telephone calls. The C-Chip 10 would also allow the telecommunications carrier for one country to connect to other telecommunications carriers in other countries allowing the user to make and receive telephone calls from different geographical locations. In the alternative, only one slot may be provided in the cellular phone, which would require the user to replace the C-Chip 10 with the corresponding C-Chip 10 associated with the geographical location where the user needs to use the cellular phone.

Furthermore, the user may limit to purchasing only one C-Chip 10, which would be programmed first to operate in the United States and Canada, and subsequently re-programmed to work in England. Once the user arrives in Egypt, the user would re-program the C-Chip 10 to be able to operate the cellular phone in Egypt. Thus, the C-Chip 10 and cellular phone, according to the present invention, provides the user with flexibility to have access to multiple telecommunications carriers throughout the world. Those skilled in the art will appreciate that the C-Chip 10 may be implemented to other wireless units, such as PDAs and monitoring units transmitting and receiving information from users located around the world.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wireless communication system, comprising:
a processor self-authenticating to a network of a telecommunications provider corresponding to a geographical region where the wireless communication system is to be used and to which the wireless communication system has not yet entered and, after self-authenticating and before entering the geographic region, being reprogrammed with a protocol downloaded from the network and corresponding to the geographical region so as to operate the wireless communication system in accordance with the downloaded protocol when the wireless communication system subsequently enters the geographic region.

2. The wireless communication system as recited in claim 1, further comprising:
a slot adapted to allow insertion to and removal from the wireless communication system of the processor, the slot being provided in a battery of the wireless communication system or within the wireless communication system.

3. The wireless communication system as recited in claim 1, wherein the processor comprises a permanent or removable storage comprising an EEPROM, RAM, or ROM on which the protocol is stored and executed.

4. The wireless communication system as recited in claim 1, wherein, upon an end user of the wireless communication system providing a proper authentication code through the wireless communication system, the processor self-authenticates by providing manufacturer data, a serial number, and operational information to the network.

5. A wireless communication system, comprising:
processors, each programmed with a protocol of a telecommunications provider corresponding to a geographical region, each processor programmed with a different protocol than the other processors; and
slots accessible by an end user of the wireless communication system and receiving the processors into the wireless communication system from the end user, the received processors being individually selectable by the end user to operate the wireless communication system in accordance with the protocol programmed in an individually selected processor in the geographical region corresponding to the protocol programmed in the individually selected processor.

6. The wireless communication system as recited in claim 5, further comprising:
a toggle switch to select an individual processor of the processors by the end user.

7. The wireless communication system as recited in claim 5, further comprising:
toggle switches, each associated with one of the processors to individually select the associated processor by the end user.

8. The wireless communication system as recited in claim 5, wherein each processor is programmed with a protocol by connecting the processor to a computer by the end user, and downloading the protocol to the processor from the telecommunications provider through the computer by the end user.

9. The wireless communication system as recited in claim 5, wherein the slots are formed in a battery of the wireless communication system.

10. A method comprising:
downloading a protocol from a network to a processor by an end user of a wireless communication system to thereby program the processor with the downloaded protocol, the downloaded protocol being a protocol of a telecommunications provider and corresponding to a geographical region, and the processor being outside of the wireless communication system when the protocol is downloaded from the network to the processor;
inserting the processor having been programmed with the downloaded protocol into the wireless communication system by the end user, to thereby allow the wireless communication system to be operable in accordance with the downloaded protocol programmed in the inserted processor; and
operating the wireless communication system in accordance with the downloaded protocol programmed in the inserted processor by the end user, wherein the wireless communication system is a cellular phone or a personal digital assistant (PDA), and the processor is not on a SIM card.

11. The method as recited in claim 10, further comprising, before downloading the protocol,
providing by the processor to the network, upon the end user providing a proper authentication code through the wireless communication system, manufacturer data and a serial number to the network, to thereby provide for self-authentication by the processor before allowing the protocol to be downloaded.

12. A method comprising:
installing a processor in a wireless communication system by an end user of the wireless communication system;
connecting, by the end user, the wireless communication system having the installed processor to a computer to access a network;
accessing, by the connected wireless communication system through the computer accessing the network, a host provider corresponding to a telecommunications provider of a geographical region where the end user needs to use the wireless communication system;
transmitting an authentication code from the processor to the accessed host provider;
initializing and authenticating the processor by the host provider in accordance with the authentication code transmitted to the accessed host provider;
after initializing and authenticating the processor by the host provider,
downloading to the processor from the accessed host provider a phone number and a phone network identification number,
downloading to the processor a protocol of a telecommunications provider, the downloaded protocol corresponding to the geographic region, and
executing the downloaded protocol by the processor to operate the wireless communication system in accordance with the downloaded protocol.

13. The method as recited in claim 12, wherein said initializing and authenticating comprises:
providing manufacturer data, a serial number, and operational information from the processor to the host provider.

14. A method comprising:
connecting a wireless communication system to a computer by an end user of the wireless communication system;
downloading a protocol and a phone number from a network to the connected wireless communication system through the computer by the end user, wherein the downloaded protocol is a protocol of a telecommunications provider and corresponds to a geographic region of the telecommunications provider in which the end user will operate the wireless communication system, and the phone number is a phone number corresponding to the wireless communication system for use by the wireless communication system in the geographic region;
disconnecting the wireless communication system, having the downloaded protocol, from the computer by the end user; and
executing the downloaded protocol by the wireless communication system in the geographic region to thereby cause the wireless communication system to operate in accordance with the downloaded protocol and the downloaded phone number in the geographic region.

15. A method as in claim 14, further comprising, after said connecting and before said downloading:
self-authenticating the wireless communication system to the network by the wireless communication system.

16. An apparatus comprising:
means for connecting a wireless communication system to a computer by an end user of the wireless communication system;
means for downloading a protocol and a phone number from a network to the connected wireless communication system through the computer by the end user, wherein the downloaded protocol is a protocol of a telecommunications provider and corresponds to a geographic region of the telecommunications provider in which the end user will operate the wireless communication system, and the phone number is a phone number corresponding to the wireless communication system for use by the wireless communication system in the geographic region;
means for disconnecting the wireless communication system, having the downloaded protocol, from the computer by the end user; and
means for executing the downloaded protocol by the wireless communication system in the geographic region to thereby cause the wireless communication system to operate in accordance with the downloaded protocol and the downloaded phone number in the geographic region.

17. An apparatus as in claim 16, further comprising:
means for, after connecting the wireless communication system and before downloading the protocol, self-authenticating the wireless communication system to the network by the wireless communication system.

18. A method comprising:
downloading a protocol from a network to a processor by an end user of a wireless communication system to thereby program the processor with the downloaded protocol, the downloaded protocol being a protocol of a telecommunications provider and corresponding to a geographical region, and the processor being outside of the wireless communication system when the protocol is downloaded from the network to the processor;

inserting the processor having been programmed with the downloaded protocol into the wireless communication system by the end user, to thereby allow the wireless communication system to be operable in accordance with the downloaded protocol programmed in the inserted processor;

operating the wireless communication system in accordance with the downloaded protocol programmed in the inserted processor by the end user; and, before downloading the protocol, providing by the processor to the network, upon the end user providing a proper authentication code through the wireless communication system, manufacturer data and a serial number to the network, to thereby provide for self-authentication by the processor before allowing the protocol to be downloaded.

* * * * *